(12) United States Patent
Collins et al.

(10) Patent No.: US 7,363,389 B2
(45) Date of Patent: Apr. 22, 2008

(54) APPARATUS AND METHOD FOR ENHANCED CHANNEL ADAPTER PERFORMANCE THROUGH IMPLEMENTATION OF A COMPLETION QUEUE ENGINE AND ADDRESS TRANSLATION ENGINE

(75) Inventors: Brian M. Collins, Aloha, OR (US); Frank L. Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 09/819,997

(22) Filed: Mar. 29, 2001

(65) Prior Publication Data

US 2002/0144001 A1   Oct. 3, 2002

(51) Int. Cl.
*G06F 15/16* (2006.01)
(52) U.S. Cl. .................. 709/250; 370/310; 370/352; 370/353; 370/354; 370/463
(58) Field of Classification Search ............... 709/250
See application file for complete search history.

(56) References Cited

U.S. PATENT DOCUMENTS 6,564,271 B2 *   5/2003   Micalizzi et al. ............. 710/39
6,704,831 B1 *   3/2004   Avery .......................... 710/310

* cited by examiner

*Primary Examiner*—Niketa Patel
(74) *Attorney, Agent, or Firm*—Schwegman, Lundberg & Woessner, P.A.

(57) ABSTRACT

A method and apparatus for enhancing channel adapter performance that includes a host interface, a link interface, a packet processing engine, an address translation engine, and a completion queue engine. The host interface is connected to a memory by a local bus. The memory contains one or more completion queues and an event queue. The link interface is connected to a network. The packet processing engine moves data between the host interface and the link interface. The address translation engine translates a virtual address into a physical address of a translation protection table in the memory. The completion queue engine processes completion requests from the packet processing engine by writing the appropriate completion queue and/or event queue. The packet processing engine is not impacted by any address translation functionality, completion queue accesses, or event queue accesses thereby significantly enhancing the performance of a channel adapter.

11 Claims, 14 Drawing Sheets

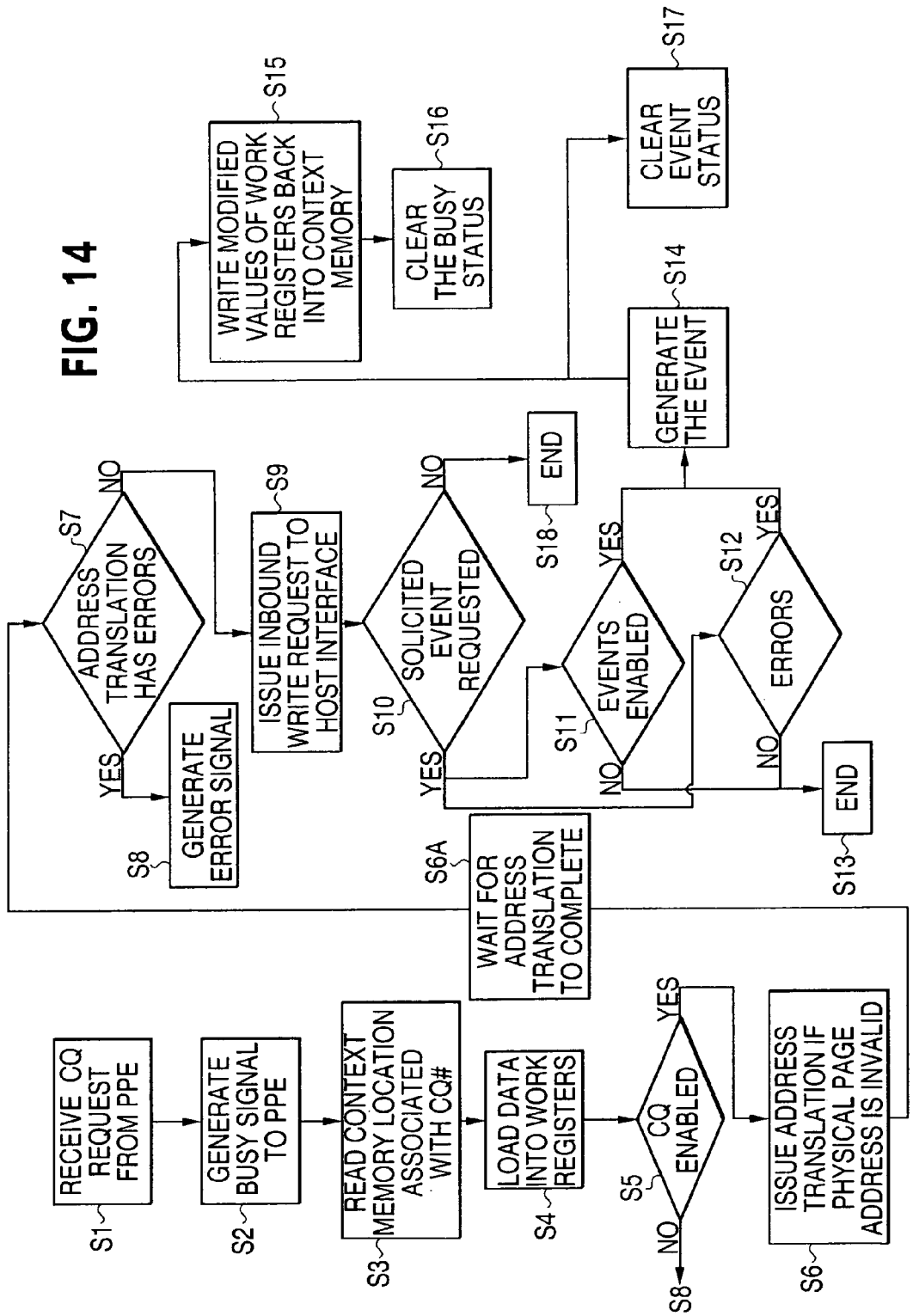

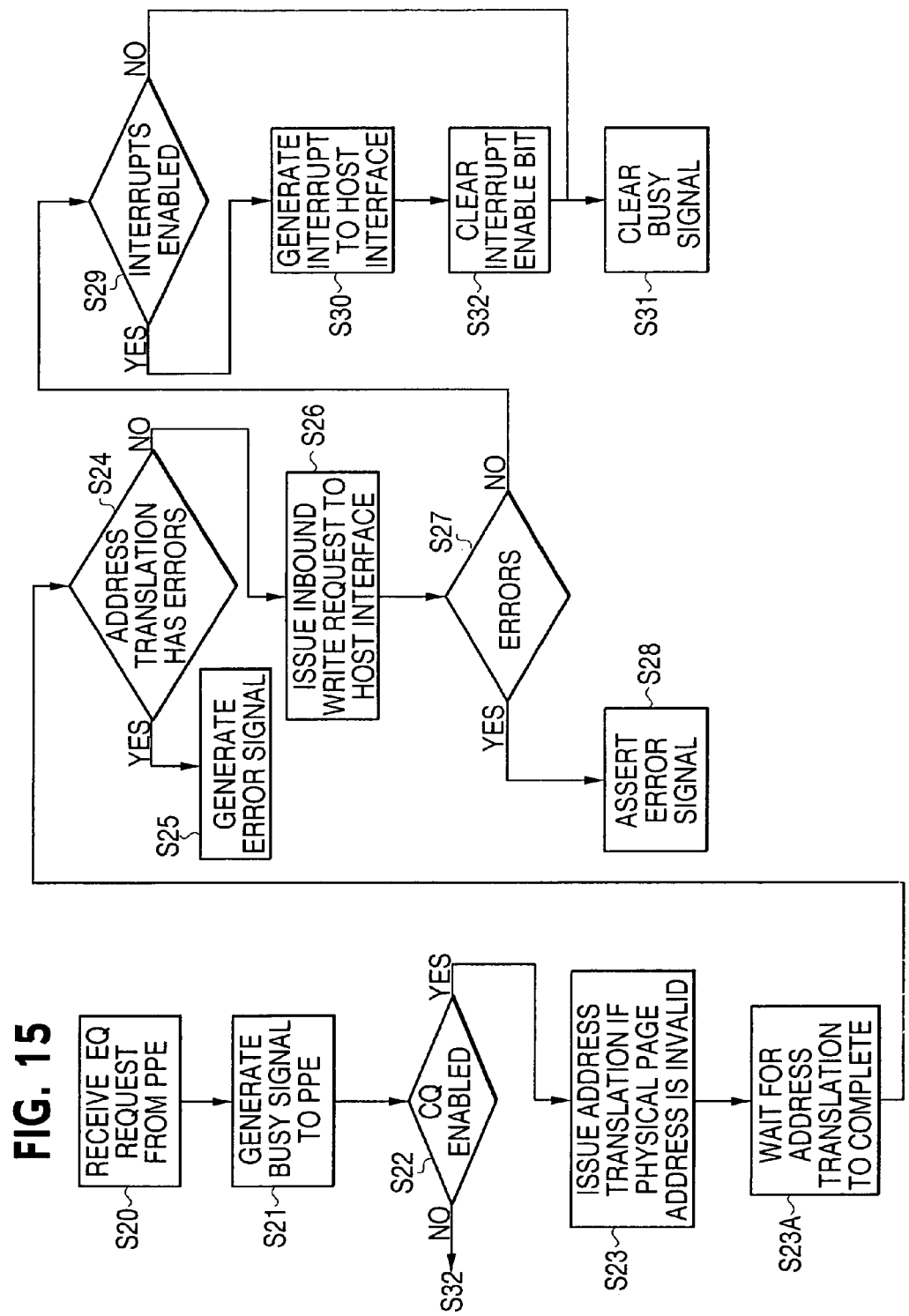

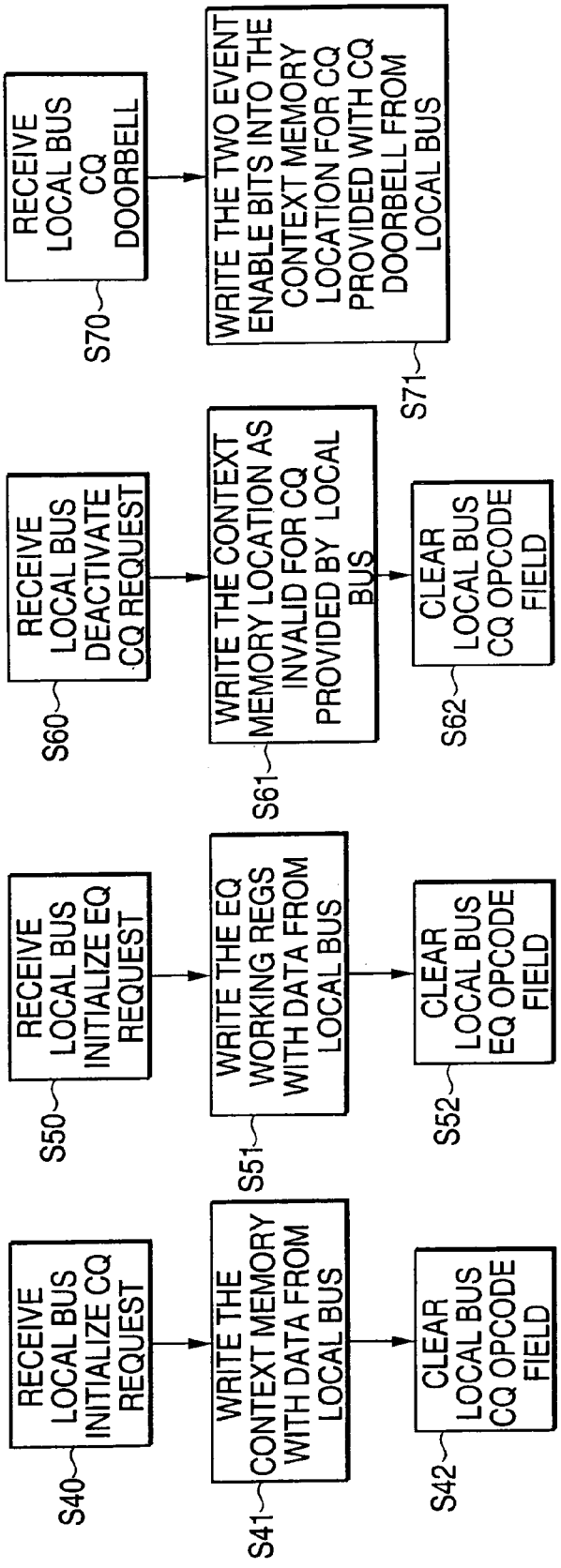

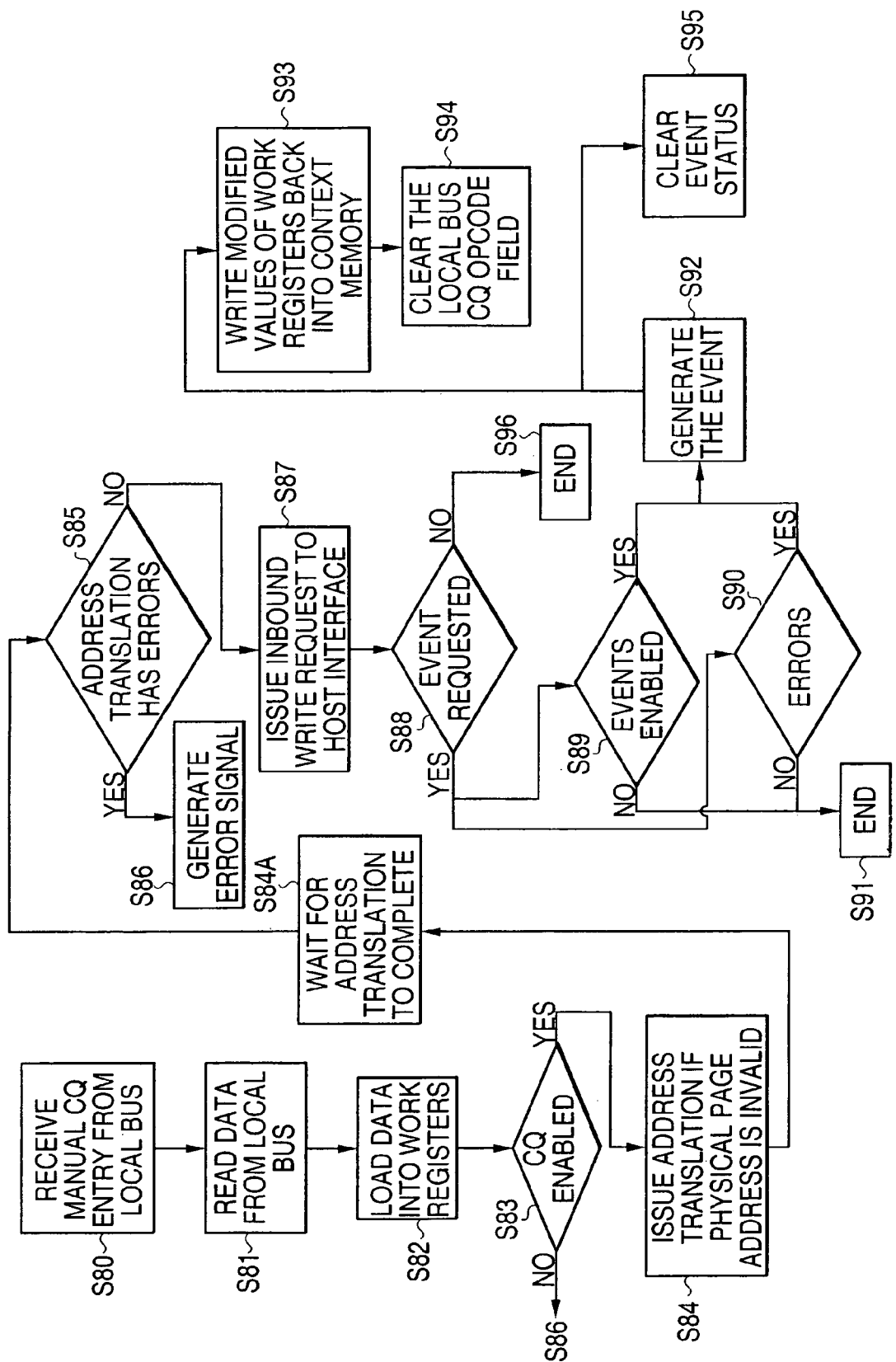

APPARATUS AND METHOD FOR ENHANCED CHANNEL ADAPTER PERFORMANCE THROUGH IMPLEMENTATION OF A COMPLETION QUEUE ENGINE AND ADDRESS TRANSLATION ENGINE

BACKGROUND

1. Field

This invention relates to channel adapters, and more specifically to channel adapters with enhanced performance due to implementation of a completion queue engine and address translation engine.

2. Background

Many systems that use switched fabric networks (e.g., Infiniband, Next Generation I/O (NGIO), etc.) use channel adapters to send information between nodes on a switched fabric network across the switched fabric network. Channel adapters may be used to connect a host processor to the fabric (e.g., host channel adapter), or connect an I/O adapter to the fabric (e.g., target channel adapter). Channel adapters may receive instructions for a task orwork to be performed by the channel adapter from an operating system or software application at the host processor or I/O adapter.

The channel adapter receives a virtual address or a portion of a virtual address from the operating system or application and converts this virtual address into a physical address of a memory location in system memory. Moreover, a channel adapter monitors progress of tasks or ongoing work to determine when the work has been completed, whereby the channel adapter may store a completion status so that the application or operating system may be alerted as to the completion of the work.

Much of the work performed by a channel adapter centers around retrieving information from system memory, converting the information into packets, and transporting the packets across the network, or vise versa. When work has been completed, notification of this fact is stored in a completion queue, resident in system memory. One entry in a completion queue may store completion status for several data buffers orwork queues in system memory. Further, there may be multiple completion queues.

In a channel adapter, the packet processing function may consist of a micro-engine running microcode. Microcode provides a flexible, but critical resource for the packet processing function. Each clock cycle causes a single instruction to be executed to facilitate packet processing. Adding routines in microcode to handle all of the address translation requests adds significant overhead to the microcode. Complex arithmetic and comparison operations are required to handle address translation. Similarly, adding routines in microcode to handle all of the processing required for support of completion queues also adds significant overhead to the microcode. Additionally, there are relatively long latencies associated with reads to system memory. Cycles spent executing instructions used to process address translations or a completion of an event, are instructions where messages are not being processed. One of the most important aspects of a channel adapter is its performance. Adding any overhead to the microcode-based packet processing function impacts performance and may have implications as to the efficacy of the channel adapter.

Therefore, there is a need for enhancing channel adapter performance without impacting the packet processing function.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 14 is a flowchart for CQ request processing according to an example embodiment of the present invention;

FIG. 15 is a flowchart of event key request processing according to an example embodiment of the present invention;

FIG. 16 is a flowchart of completion queue requests processing according to an example embodiment of the present invention;

FIG. 17 is a flowchart of event queue request processing according to an example embodiment of the present invention;

FIG. 18 is a flowchart of deactivate completion queue request processing according to an example embodiment of the present invention;

FIG. 19 is a flowchart of completion queue doorbell processing according to an example embodiment of the present invention; and FIG. 20 is a flowchart of manual completion queue entry processing according to an example embodiment of the present invention.

DETAILED DESCRIPTION

Figure 1:
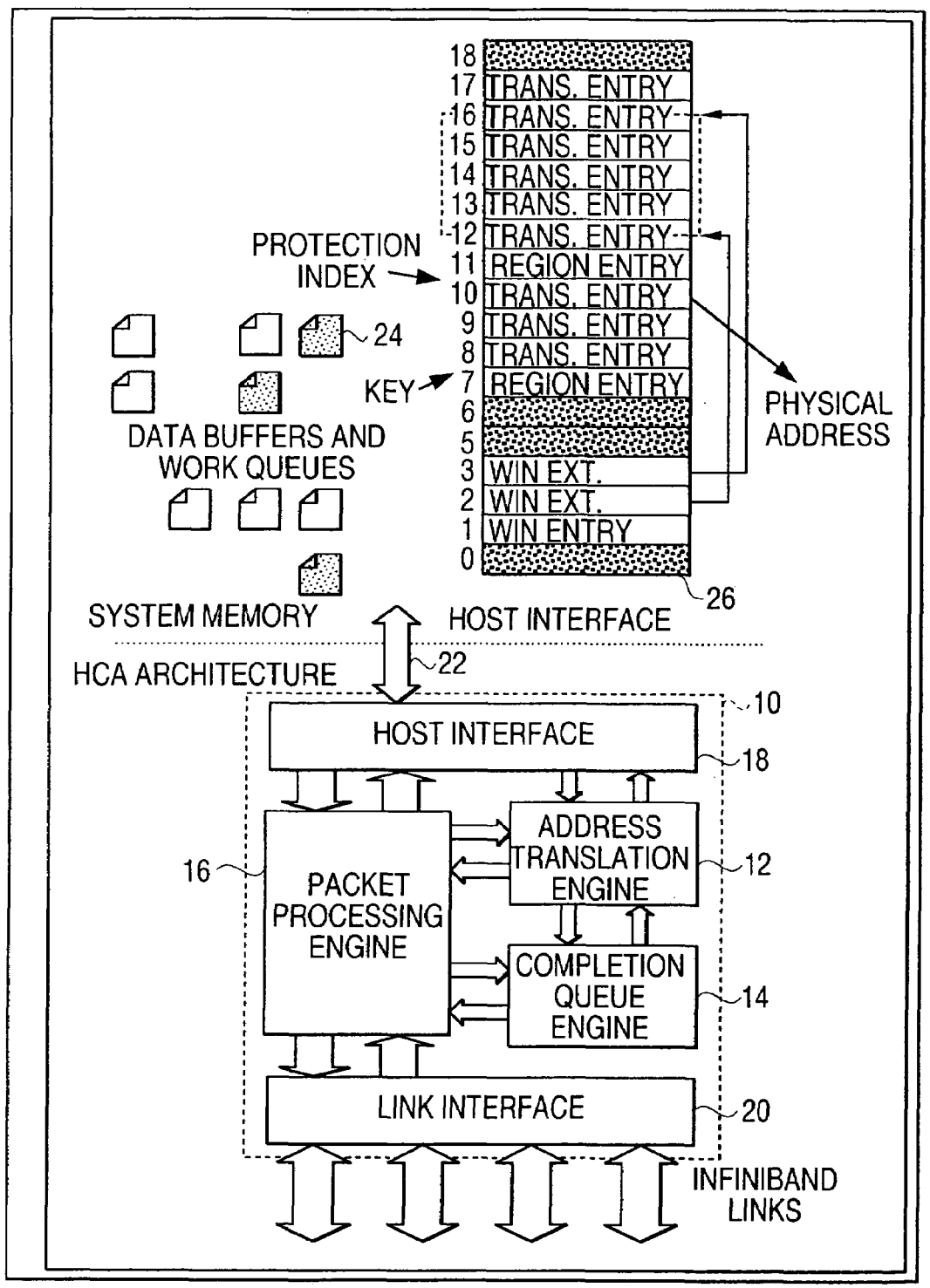
FIG. 1 is a diagram of a system for enhanced channel adapter performance according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within the purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to apparatus and method for enhanced channel adapter performance through implementation of an address translation engine and completion queue engine. The address translation engine supports a two level translation and protection table (TPT). The translation and protection table is a construct resident in system memory which may be used by a channel adapter to convert virtual addresses (e.g., used by software, such as operating systems, applications, etc.) into physical addresses, used by the channel adapter. The completion queue engine, similar to the address translation engine, operates independently of the packet processing function, and manages completion queue and event queue processing.

A translation and protection table that is resident in system memory will be used to illustrate the present invention. However, the translation and protection table may be resident outside of system memory and still be within the spirit and scope of the present invention. The TPT may be written by driver software based on physical memory pages locked down by an operating system for use by the channel adapter. The channel adapter requires access to physical addresses to remove any requirement for software to intervene on work in progress by the channel adapter. The channel adapter may read and write all of the relevant work queues, data buffers, completion queues, event queues, etc., so long as the TPT has been correctly configured in system memory. Access to the system memory TPT is accomplished through the address translation engine. The address translation engine accepts requests from sources requiring physical addresses and returns physical addresses to the requester after reading the TPT. These requests may be from sources within or outside of the channel adapter.

The format of the individual entries in a TPT may be defined depending on the particular application used. A TPT may consist of a number of physically contiguous memory pages that are readable by a channel adapter. An entry in a TPT may be any one of three types: a translation entry, a region entry, or a window entry. A translation entry in a TPT may consist of protection information as well as a physical address for a single page of system memory. A translation entry provides the virtual address to physical address mapping (e.g. virtual page to physical page). When a software application desires to allocate N pages of virtual contiguous memory, N+1 contiguous unallocated entries in the TPT must be located. These entries may be located by driver software, and then filled with the appropriate address translation information to allow a channel adapter to convert virtual addresses used by an application into physical addresses allocated by the operating system. The N+1 entries in the TPT may be collectively referred to as a memory region.

The first entry of this memory region may contain information regarding the number of memory pages in the region and the protection information associated with this region. The remaining TPT entries associated with the given memory region may provide a one to one mapping of virtual page addresses to physical page addresses. A region entry may also contain a length indication, allowing an address translation engine to use this length to perform bounds checking for accesses to the given region (i.e., does the entire data transfer fit within the total size of the memory region). This feature of the present invention is advantageous in that it allows a channel adapter to prevent "rogue" virtual addresses in use in the system from crossing into a memory region being used by a different application. Further, a region entry may contain a remote key value. The remote key value (e.g., 6 bits) is a number which may be verified with the key provided by a remote channel adapter when accessing this memory region. The remote key value allows protection from changing the region entry after a remote key has been passed (via higher level protocol) to the remote channel adapter. These protections, along with a set of access rights, may be checked on each access by an address translation engine in the channel adapter.

A memory page may be, for example, 4K locations in size. Therefore, using memory regions defined in a TPT, the system can protect portions of memory with single 4K page granularity. Thus, only specific applications or channel adapter functions are allowed access to given portions of memory. A TPT according to the present invention also provides a method for protecting memory at single byte granularity. This may be done with window entries. Specifically, a group of three TPT entries may be used to define specific protections and access rights for some subsection of a memory region. A window entry may contain a lower and upper byte address of a specific memory region. Window entries may be generally used to allow remote channel adapters (connected via links across a network fabric) access to only some portion of the local system memory. A window entry may contain a set of protection information that is specific to the type of remote access set up by software. A window entry may contain a length indication (implied by the upper and lower bounds of the defined memory window) and a remote key value as discussed previously regarding a region entry.

Memory regions and window entries in a TPT may require two accesses to the TPT for the first address translation request of a given data buffer. A channel adapter accesses the region entry or window entry to determine the size of the memory region and to check the appropriate protections. Subsequent accesses may use the resultant protection index (i.e., physical TPT address) from the first access during future requests (e.g., such as when a data buffer crosses a page boundary). A second access to the TPT may be required to locate the specific virtual page to physical page mapping contained in a given translation entry.

FIG. 1 shows a diagram of a system for enhanced channel adapter performance according to an example embodiment of the present invention. FIG. 1 shows system memory and a channel adapter architecture separated by a horizontal dashed line. A host interface 18 which may connect to a bus 22 (e.g., Peripheral Component Interface (PCI), PCI-X, H16, etc.) interconnects system memory with channel adapter 10. Channel adapter 10 may include, along with host interface 18, a packet processing engine 16, address translation engine 12, completion queue engine 14, and link interface 20. System memory includes data buffers and work queues 24, as well as a translation protection table (TPT) 26. TPT 26 may include a plurality of entries, including window entries, region entries and translation entries. Link interface 20 interfaces channel adapter 10 to a switched fabric or other network. Packet processing engine 16 transfers data from system memory, converts the data to packets, and sends the packets across the link interface to the switched fabric network, and vice versa. Address translation engine 12 performs the virtual to physical address translation using TPT 26. Completion queue engine 14 manages the one or more completion queues and event queues (not shown here) that reside in system memory and records the status of completed work by writing new completion entries to system memory completion queues.

An example TPT 26 is shown consisting of two defined memory regions (the first occupying TPT locations 7-10, and the second occupying locations 11-17) and one defined window entry (occupying TPT locations 1-3 and specifying a portion of one of the memory regions). Packet processing engine 16 and completion queue engine 14 have a need to convert virtual addresses, used to define virtually contiguous memory locations used for work queues, data buffers and completion queues, into physical addresses in system memory. Address translation engine 12 accomplishes this task for channel adapter 10. Completion queue engine 14 and packet processing engine 16 may issue requests for address translation to address translation engine 12. Address translation engine 12 may validate that their request lies within the programmed bounds of TPT 26 and performs a system memory read of the appropriate TPT locations. This may be done without further interaction with the requester (e.g., packet processing engine 16, completion queue engine 14, etc.). Address translation engine 12 handles numerous requests and automatically performs a second access to TPT 26 should the first access indicate that one is required.

For a first translation of a given data buffer, the request provides an index into the TPT called a key. The key is used to access either a region entry or a window entry. Address translation engine 12 upon reading a region entry or window entry referenced by the key, performs permission checking and may calculate a second index into the TPT Table, called the protection index, based on the virtual address issued with the translation request (from packet processing engine 16) and the application handle (i.e., TPT physical address) from the region or window entry. This second protection index may be used during a second access to the TPT to read a translation entry. A translation entry contains the physical address which may be returned to the requestor so that the appropriate memory access may be completed. Subsequent accesses for a given data buffer need only use the calculated second protection index returned by the address translation. Given that a data buffer is virtually contiguous and entries in an individual memory region within the TPT Table are physically contiguous, a second read of the TPT is all that may be required when crossing page boundaries.

Figure 2:
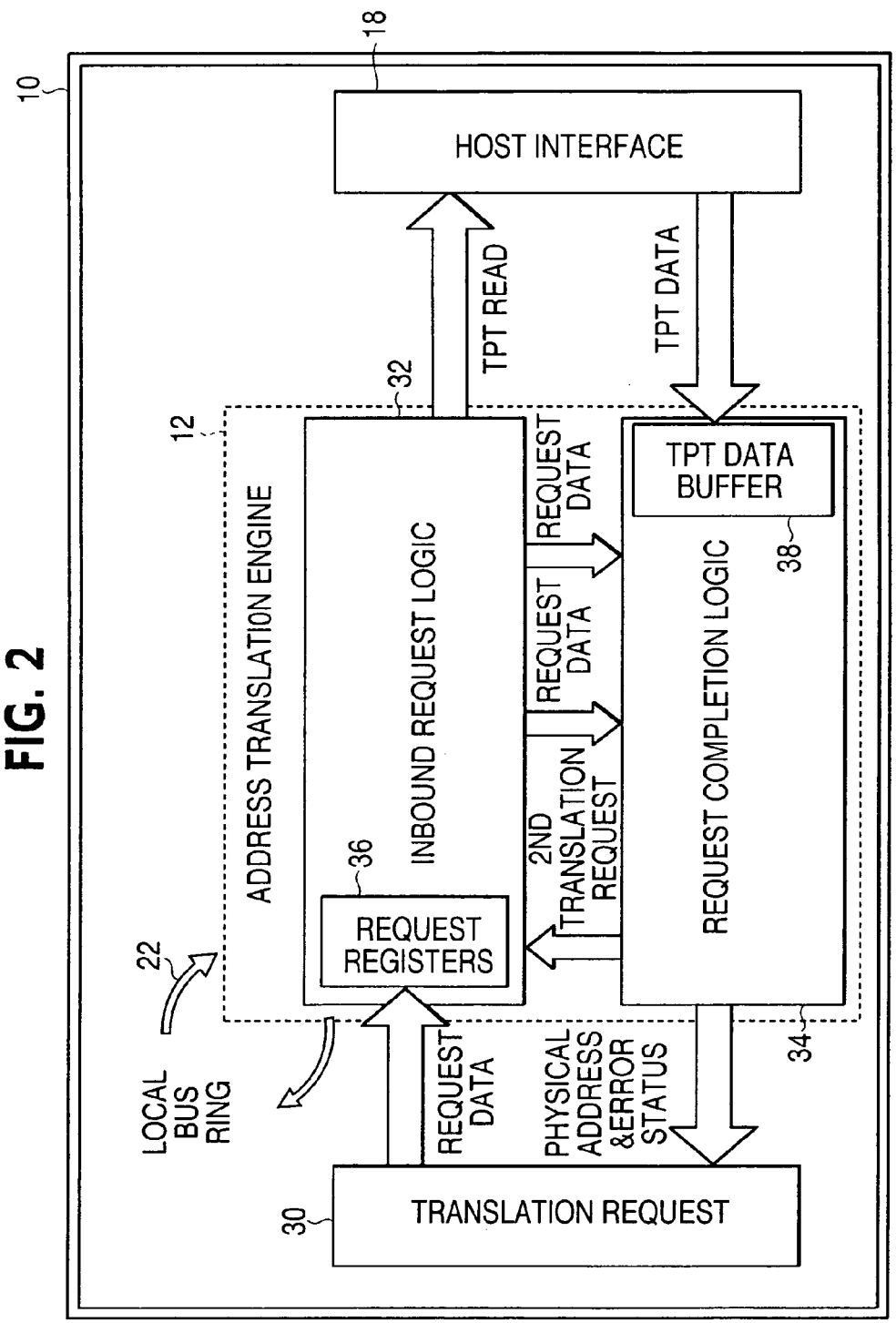
FIG. 2 is a block diagram of an address translation engine according to an example embodiment of the present invention.

FIG. 2 shows a block diagram of an address translation engine according to an example embodiment of the present invention. Address translation engine 12 consists of two major subblocks, inbound request logic 32 and request completion logic 34. Address translation engine 12 may communicate with portions of channel adapter 10 requiring address translation requests. These portions may include packet processing engine 16 and completion queue engine 14 (FIG. 1.) Requests for address translation may come from sources external to channel adapter 10 and still be within the spirit and scope of the present invention. Address translation engine inbound request logic 32 supports a set of request registers used to buffer requests for address translations. Valid physical addresses may be returned to a requestor via request completion logic 34. Address translation engine 12 also communicates with host interface 18 in order to access system memory. Requests for system memory reads may be issued by inbound request logic 32 and are returned and processed by request completion logic 34. Request completion logic 34 supports a set of TPT data registers used to buffer read completions that may return back to back from host interface 18. Address translation engine 12 also supports a local bus 22. Local bus 22 provides a programming interface for registers supported by the channel adapter. Specifically, address translation engine 12 supports registers indicating the size and base physical address of TPT 26 in system memory.

The architecture of address translation engine 12 takes advantage of the parallelism between the inbound and outbound address translation requests. Each portion of the address translation engine 12 acts as a large pipe. Requests enter into inbound request logic 32 and are passed to host interface 18. After a period of time, completions return from host interface 18 and are processed in request completion logic 34 and returned to the requester, or reintroduced to inbound request logic 32 to support a second translation request if required. The present invention allows both pipes to work largely independently of each other, only sharing an interface to handle second translation requests and error cases. Data registered with a request may also pass between pipes to allow for calculations and permission checking in request completion logic 34.

Figure 3:
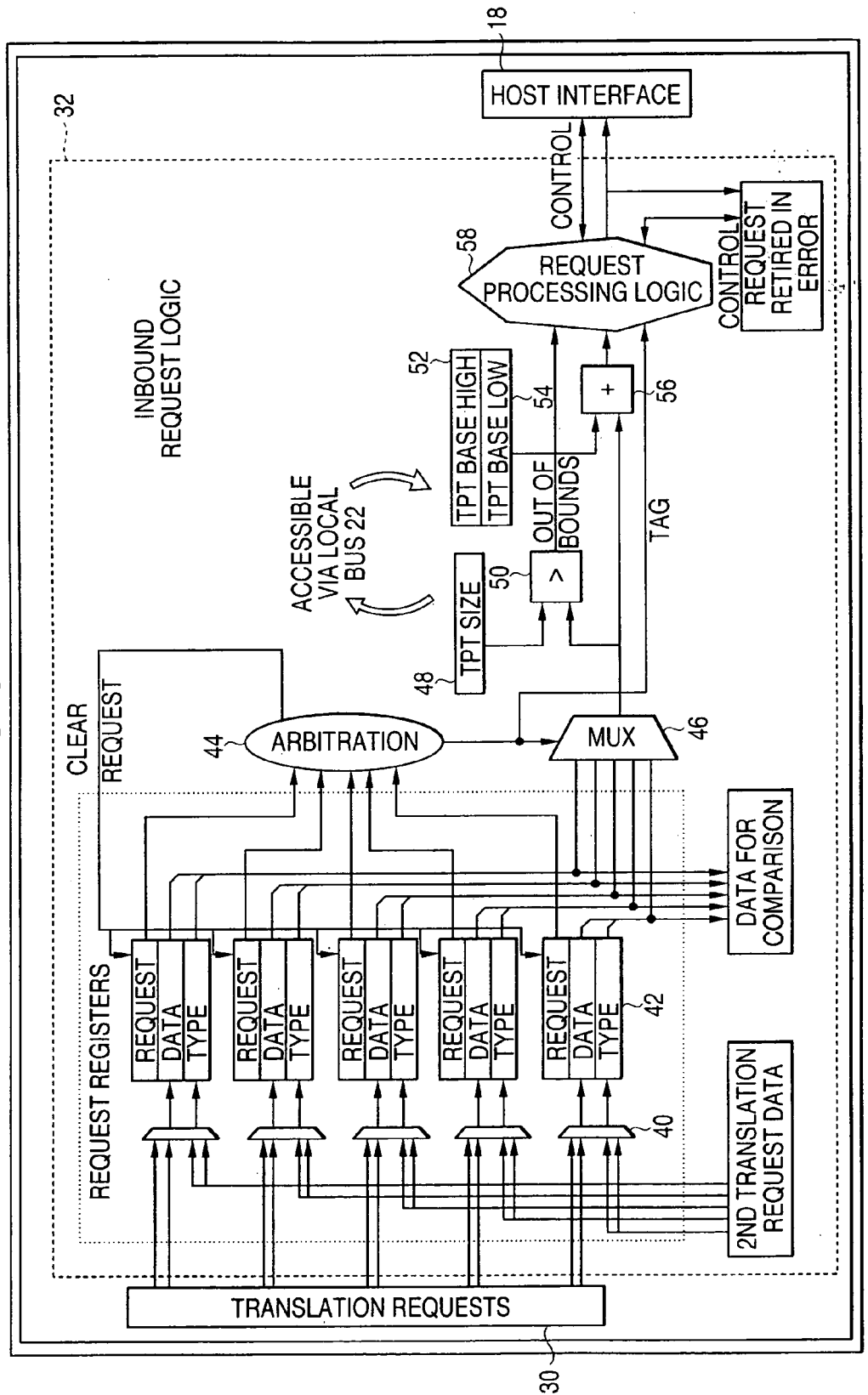
FIG.3 is a diagram of example inbound request logic according to an example embodiment of the present invention.

FIG. 3 shows a diagram of inbound request logic according to an example embodiment of the present invention. Translation requests 30 may be received from a requestor (e.g., packet processing engine 16, completion queue engine 14, etc. (FIG. 1)), and passed to one or more switching devices 40. Switching device 40 switches between requests that are original requests coming from interface 30 and second translation requests that may be coming from request completion logic 34 (FIG. 2). A switching device may exist for each set of request registers 42. In this example embodiment, address translation engine 12 (FIG. 1) supports five outstanding address translation requests, (e.g., four from packet processing engine 16 and one from completion queue engine 14).

Five sets of request registers 42 support the five outstanding address translation requests. Request register sets 42 may be used to store the information relevant for a given request. This may include the key and virtual address for the first translation for a given data buffer or just a protection index for requests in the middle of a data buffer or accessing a completion queue or event queue. All request types may require protection information. The output of each request register set 42 may be sent to request completion logic 34 (FIG. 2) for data comparison, and sent to another switching device 46. Arbitration logic 44 performs a priority scheme (e.g., round robin) to determine which request should be processed. Once this selection is made, arbitration logic 44 controls switching device 46 to pass the appropriate protection index or key through switching device 46 and towards further processing. Arbitration logic 44 may then also clear the request register of request register set 42 for the associated request. The data register of request register set 42 may contain a variety of information, for example, a virtual address, a key, a protection index, permissions for the page, a protection domain, etc. The type register of request register set 42 denotes whether the request is a first request or a second request (i.e. from request completion logic 34 (FIG. 2).

Figure 4:
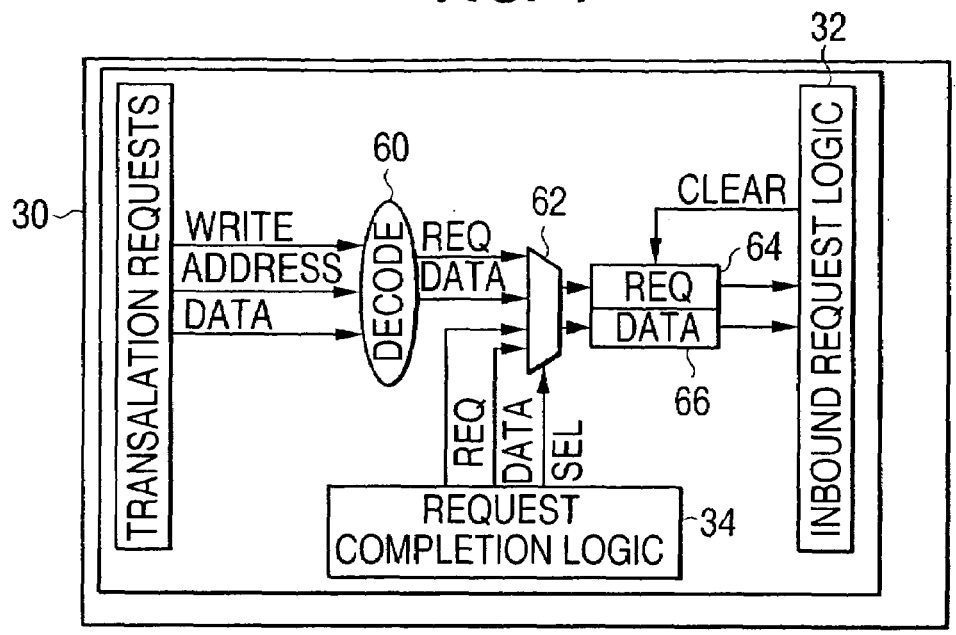
FIG. 4 is a schematic diagram of details of a request register according to an example embodiment of the present invention.

FIG. 4 shows a schematic diagram of details of a single request register shown in FIG. 3 according to an example embodiment of the present invention. A requesting interface has write access to a request register. A request may be issued to address translation engine 12 (FIG. 1) by asserting a write signal and providing valid data information and an address field used to identify which piece of information is provided on the data bus. Each request may be allowed a single outstanding address translation. Request completion logic 34 may also load a request into the inbound request registers 42. This may be done to allow for the second address translation to complete autonomously without involving the requestor at all. Given that each requestor may only be allowed a single outstanding request, request completion logic 34 may overwrite the appropriate values in the original request (e.g., changing the key originally provided with the request into the calculated protection index generated to access the translation entry and modifying the type indication as appropriate). The implementation of request registers according to the present invention are advantageous in that a requestor may set up a request and then proceed to do other valid operations. For example, packet processing engine 16 may initiate a request, and then may switch to another task directly related to moving messages across the switched fabric.

Decoder 60 decodes the address information to determine what type of data is on the data lines. Decoder 60 then generates a request and forwards the request and data to switching device 62. Switching device 62 selects between translation requests that are a first request coming from translation request 30 or a translation request (i.e., second request) coming from request completion logic 34. The request is stored in register 64 and the data in register 66 before being sent to inbound request logic 32.

Returning to FIG. 3, once an address translation request has been stored in the request registers, a request signal may be passed to arbitration logic 44 which selects fairly between all outstanding requests and passes a single requested key or protection index to inbound request logic 32. Arbitration logic 44 associates a tag value with each request (e.g., three bits). This tag value may be used to reorder requests after being issued to host interface 18. The tag value is important in that it allows both halves of address translation engine 12 to operate independently of each other. Moreover, the tag value may be used to select the appropriate data for comparison in request logic 34.

Registers 48, 52 and 54 contain values for the TPT size, base address high and base address low respectively. Registers 48, 52, and 54 may be programmed by software, e.g., an operating system, application, etc., via local bus 22. This allows software to program device specific registers. The value in TPT size register 48 indicates the number of entries in TPT 26. This may be used by a channel adapter 10 to determine whether a key or protection index is bounded by the program size of TPT 26. Register 48 allows for improved protection against incorrect data and programming being used within channel adapter 10. Channel adapter 10 prevents all requests which would generate a request that is not contained within the programed value of the TPT size register 48. The value in TPT base address registers 52 and 54 are used by channel adapter 10 to determine the physical base address of TPT 26. This allows channel adapter 10 to correctly generate a physical address for TPT 26 by using adder 56 to add the request protection index or key value to the base to generate a physical address corresponding to the desired entry in TPT 26. Comparator 50 may be used to compare the TPT size with the key or protection index to determine whether the received key or protection index is out of bounds of the size of TPT 26. An address translation engine according to the present invention supports autonomous updates of the TPT base registers 52, 54.

Figure 5:
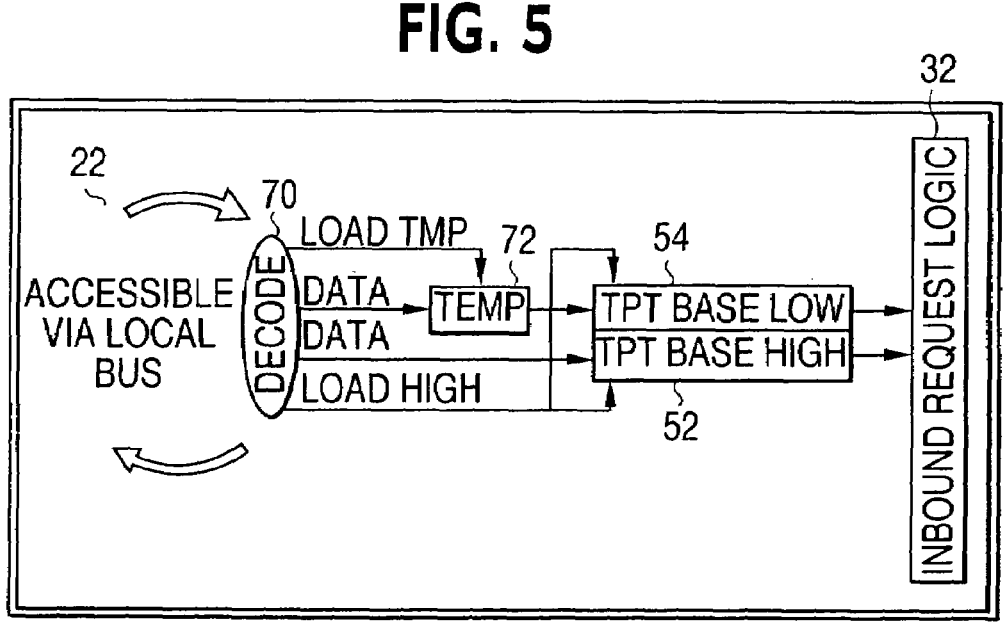
FIG. 5 is a diagram of TPT base address register logic according to an example embodiment of the present invention.

FIG. 5 shows a diagram of TPT base register update logic according to an example embodiment of the present invention. As seen in FIG. 5, software (e.g., an operating system or an application), can send information to upgrade the TPT base registers 52 and 54 via local bus 22. Decoder 70 determines whether the data is meant for the lower portion of the address or the high portion of the address. Generally, the TPT base low address may be sent first whereby this data is stored in temporary register 72. When the remainder of the TPT base address, i.e., high portion, arrives, this data is loaded into TPT base address register 52 concurrently with the TPT address low stored in temporary register 72 being loaded into TPT base address register 54. Therefore, both the high and low portions of the TPT base address are presented in parallel together to inbound request logic 32. Therefore, according to the present invention, software is allowed to autonomously and independently update the base of TPT 26. If the lower address and the upper address of the TPT base are each 32 bits, the present invention allows the operating system to issue 64 bit cycles that are received and handled by channel adapter 10 in the form of two 32 bit accesses through the internal local bus 22. This allows for autonomous update of the TPT base registers 52, 54 without any knowledge of what activity is currently in progress within address translation engine 12 or channel adapter 10. Similarly, this may apply to an operating system issuing 32 bit operations to the channel adapter.

Referring back to FIG. 3, after generation of the correct physical address based on the key or protection index value, inbound request logic 32 issues an inbound request to host interface 18. Address translation engine 12 may perform system memory operations of either 8 bytes (for a protection index request) or 24 bytes (for a key request). Reading 24 bytes, in the case of the key request, is advantageous in that should the key reference a window entry, the 24 bytes read from the TPT 26 will contain the entire window entry, including all of the protection information and the upper and lower byte address specifying the memory window bound for remote access. If the key references a region entry, then the 24 byte read may contain the protection information for that memory region as well as the first two TPT entries of that region. Should the second read of TPT 26 indicate an access to either the first or second entry in a given memory region, then address translation engine 12 may use the information for those TPT entries returned with the first 24 byte read of TPT 26. This effectively saves a second access to system memory in the case where a region entry is defined and the access begins within the first two virtual pages of that memory region. Therefore, an additional read of system memory is prevented resulting in an important performance benefit. The second read of TPT 26 is not needed since the information that would normally be read was read as a "freebie" during the first access of TPT 26. Although at first glance this may appear like overhead for a given key request to always read 24 bytes, given the defined structure of TPT table 26, this implementation is advantageous since a given request can reference either a window entry (consisting of 24 bytes) or a region entry (consisting of 8 bytes). Address translation engine 12 only knows which type of data will be resident in a TPT location indicated by the key when the value is actually read from system memory. Therefore, address translation 12 may always read 24 bytes during the first access to TPT 26 on behalf of a key request. Thus, all cases where a window entry is referenced are handled, and a chance is provided that the second TPT access may be eliminated all together when a region entry is referenced. If a request is determined to be outside the bounds of TPT 26, an inbound read request is not generated. These requests are instead passed to request completion logic 34 as an error by request processing logic 58.

Figure 6:
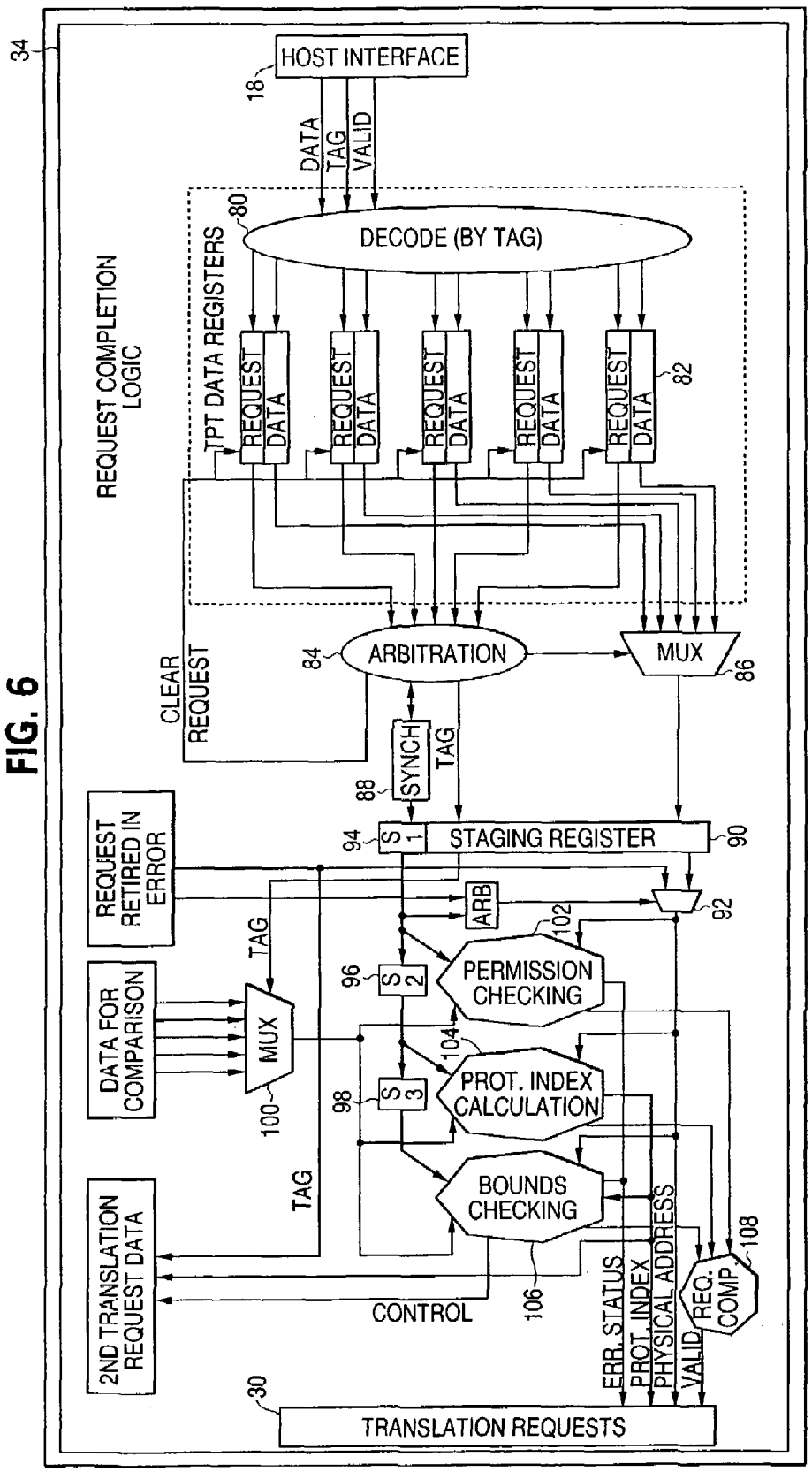
FIG. 6 is a diagram of request completion logic according to an example embodiment of the present invention.

FIG. 6 shows a diagram of request completion logic according to an example embodiment of the present invention. The resultant data from a TPT read may be received at request completion logic 34 through host interface 18. Host interface 18 returns a valid signal to request completion logic 34. This denotes that the information on the data line is valid data. The tag associated with the original request may also be received at request completion logic 34. Decoder 80 receives the tag value and uses this to decode which original request the data is associated with. Inbound read requests return the data to a set of TPT data buffers 82. Read completion from host interface 18 may be returned to address translation engine 12 out of order and back to back. TPT data buffers 82 serve as a temporary storage element for read completion data which cannot be processed immediately by request completion logic 34. The host interface may be any of many types of interfaces, for example, Peripheral Component Interface (PCI), PCI-X, Hublink-2, etc. Each host interface may operate at an entirely independent clock frequency from address translation engine 12. TPT data buffers 82 also serve as a way of synchronizing data returned by the host interface 18 to the clock frequency used by the remainder of address translation engine 12 and the requesters. Each outstanding request allowed by inbound request logic 32 was given a unique tag based on the request arbitration discussed previously. Decoder 80 uses this tag to steer the completion data to a unique TPT data buffer 82 to reorder data and guarantee that each request is processed and returned to the correct requester.

Once TPT buffers 82 have been filled with all of the bytes of a given read completion, a request is generated and sent to arbitration logic 84. Arbitration logic 84 may operate at the host interface clock frequency. Arbitration logic 84 selects a single request and passes it to staging registers 90 through synchronization logic 88. Synchronization logic 88 may be used to compensate for the difference in clock frequency. Once synchronized, the request may be registered and operated on to verify protections and determine if a second request is needed for the given address translation. Once arbitration logic 84 has selected a winning request, the associated request indication in TPT data buffer 82 is cleared. This guarantees that each request is only serviced one time. Switching device 86 may be used to transfer the data from TPT data registers 82 to staging register 90.

Requests retired in error from inbound request logic 32 may be logically multiplexed with requests registered in staging register 90 by multiplexer 100. Requests retired in error may be flagged as detecting an out of bounds error and passed back to the requestor based on the tag associated with the inbound request.

The TPT read data stored in staging register 90 undergoes a series of validity error checking. Initially, permission checking is done by permission checking logic 102. This logic decodes the read completion type (e.g., window entry, region entry, or translation entry) that was returned at completion of the read and uses the tag to determine what the original request type was based on the registered value in the request registers 42 in inbound request logic 32. In each case, similar checks are performed, i.e., access rights and protection domain are verified to match the expected values issued with the original request. If an error is detected, then an error status register may be loaded with an encoded value denoting the error type, and the request returned to the requestor.

Once permission checking has been completed, protection index calculation logic 104 performs a second check. Protection index generation logic 104 may be used during a key request to generate a protection index, which may be used to access TPT 26 for a second read. In the case of a read completion consisting of a region entry, the protection index value is checked to see if it was already read during the first request.

Once protection index calculation checking has been completed by logic 104, bounds checking may be performed by bounds checking logic 106. This logic determines the upper address based on the length of the request and the calculated value of the protection index discussed previously. In the event of an out of bounds error, an encoded value denoting the specific error type is registered and the request returned to the requestor.

A simple one bit pipeline series of registers, 94, 96 and 98 control the three functional checking operations. The first stage S1 of this pipeline, register 94, may be set when a valid request is registered in staging register 90. This qualifies the permission checking logic 102 to begin. The second stage S2 of the pipeline, register 96 may be used to qualify the result of the protection index calculation logic 104. The third stage of the pipeline S3, register 98, may be used to qualify the result of the out of bounds comparison and generate the appropriate control signals to the requester (if the translation is complete) or to the inbound request logic 32 (if a second read of TPT 26 is required).

Address translation engine 12 may automatically write the protection index calculated in protection index calculation logic 104 into the request register associated with the tag of the specific request in order to generate the second read of TPT table 26. This may be necessary under two conditions. The first condition may be if a key request references a window entry. In this case, the 24 byte read completion returns the window entry and two window extension entries. A second read of TPT table 26 may be required in order to determine the actual physical address. In this case, the protection index may be generated based on the virtual address issued with the key request, and the handle (i.e., TPT 26 physical address) read from the window entry of TPT table 26. Bounds checking may be done using the window extension entries to verify that the requested operation and length resides within the memory window defined by the window entry. The second condition may be if a key request references a region entry. The 24 byte read completion returns the region entry and the first two translation entries for that memory region. A second read of TPT table 26 may be required if neither of the first two translation entries are to be used to determine the physical address.

In both cases, the calculated protection index may be registered in inbound request logic 32 request registers, and the request indication is set. The type of this second request may always be an 8 byte protection index request. The second request is treated just like requests which originated in requests providing a protection index instead of a key value. A protection index request may always generate an 8 byte read of TPT table 26 and may never cause a second request. The read completion for a protection index request may be checked for the appropriate permissions and then returned to the requester. Only the first of the three stages discussed previously may be used to complete a protection index request.

Logic 108 uses the tag to determine which requestor receives a valid indication when the physical address is returned to the requester. The determination is made by logic 108, and a valid is sent from logic 108 to the appropriate requester.

The present invention is advantageous in that it allows the address translation engine to determine whether a second access of the TPT is required, and more importantly allows the address translation engine to generate the second request without any intervention on behalf of the original requestor. The original requester is allowed only in single outstanding requests. This guarantees that when the request completion logic loads a new request type and protection index into the inbound request logic request registers, that the value will persist without danger of being overridden by the original requestor. Additionally, the implementation of an address translation engine with two pipes allows second translation requests to be stuffed from the end of the request completion logic into the inbound request logic. This reuses all of the same checks and data paths of any inbound request and minimizes the amount of duplication of logic gates.

Requests that do not require a second translation (protection index request) have their error status and physical address passed back to the requester based on the value of the tag generated with the request. Additionally, the protection index may also be returned to the requestor so that once a page boundary is crossed, the requester has all the appropriate information to generate another request to obtain the appropriate physical address.

Figure 7:
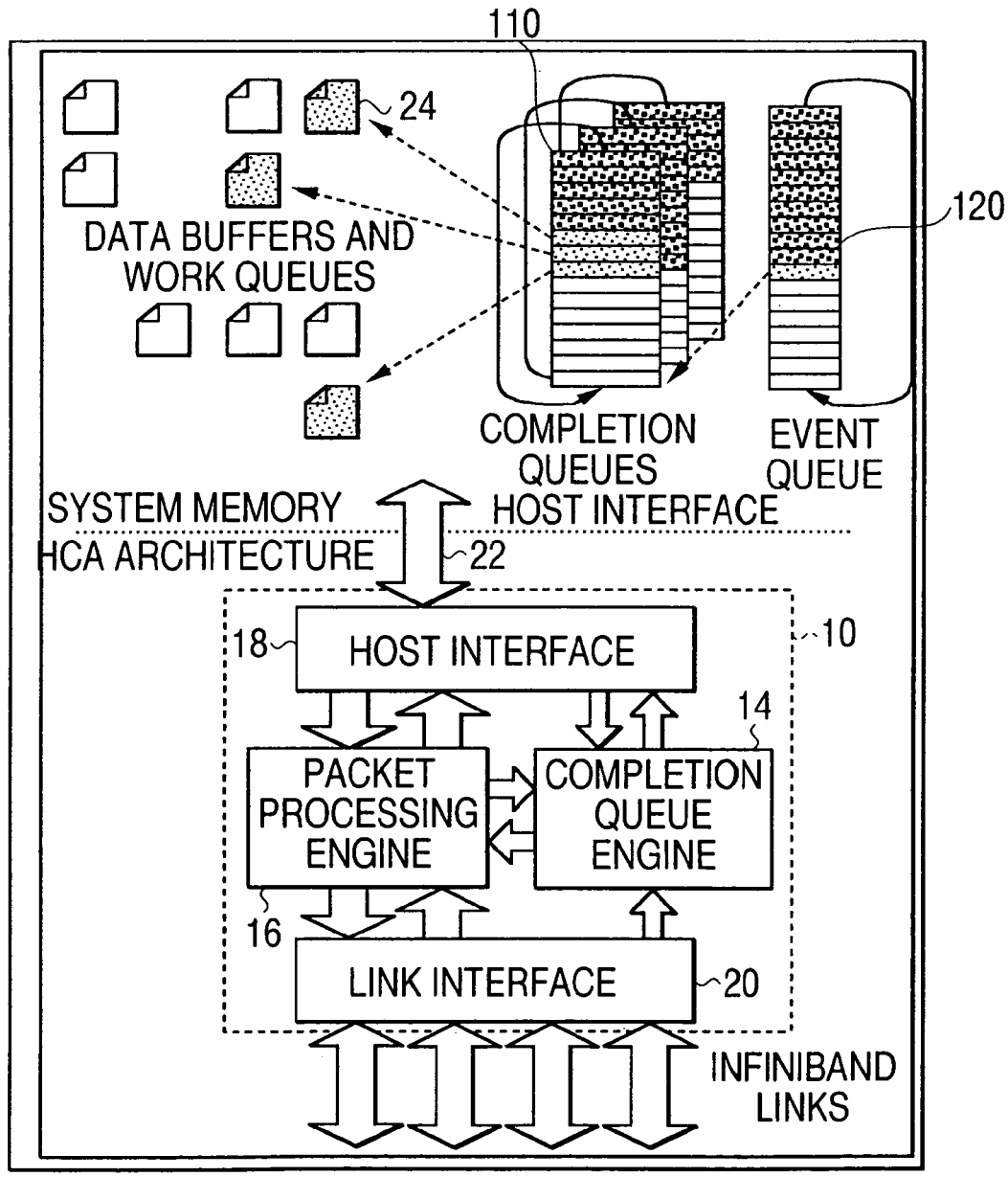
FIG. 7 is a diagram of a system for enhanced channel adapter performance with completion queues and an event queue according to an example embodiment of the present invention.

FIG. 7 shows a diagram of a system for enhanced channel adapter performance with completion queues and an event queue according to an example embodiment of the present invention. This figure is the same as FIG. 1 except that the address translation engine 12 is not shown for simplicity, and the completion queues 110 and even queue 120 are shown in system memory as opposed to TPT table 26 (also not shown for simplicity) as shown in FIG. 1. The dotted lines between completion queue 110 and the data buffers and work queues 24 denote that work has been completed and status has been stored in completion queue 110. A single entry in event queue 120 represents one entire completion queue. The one completion queue may contain a number of entries which indicate data buffers read or written by channel adapter 10 (i.e., work completed). Completion queue 14 off loads handling of all completion queue and event activity from packet processing engine 16. Packet processing engine 16 communicates with host interface 18 and link interface 20 to move data from system memory to the link interface, and vice versa.

Completion queue engine 14 is responsible for processing completion request from packet processing engine 16 and writing the appropriate completion queue or event queue entry into system memory. Completion queue engine 14 also responds to programming requests from an operating system, event enabling from applications, error and network events, system error reporting, and software based host entries to the completion queues 110. These events, although all vital to a channel adapter's overall functionality, do not have to impact packet processing performance in any way. According to the present invention, a separate unit, completion queue engine 14, handles and processes all of the completion queue and event queue requests, plus related functions of programming, system errors, event enabling, etc., allowing packet processing engine 16 to focus exclusively on moving data while completion and event details happen behind the scenes.

Figure 8:
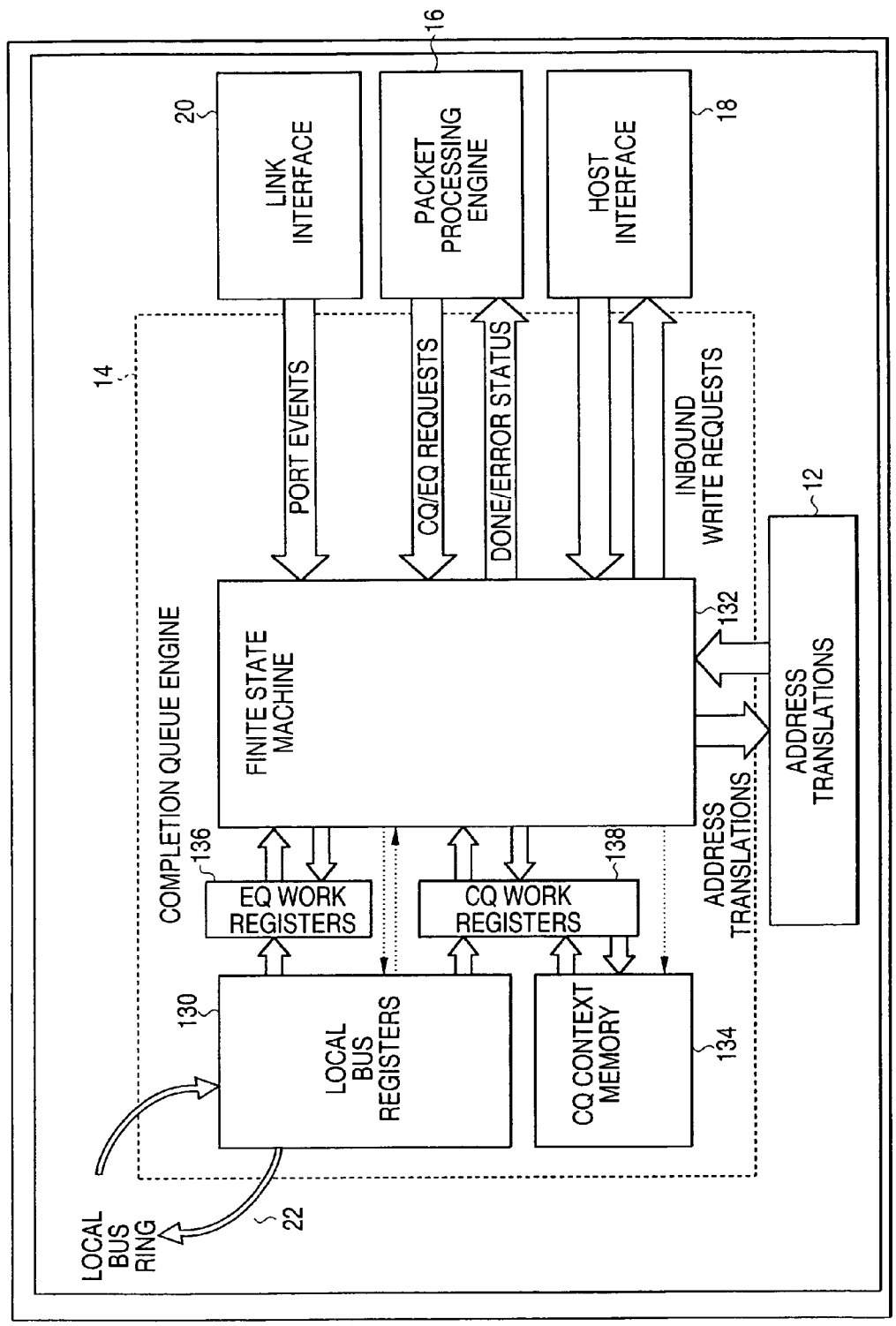
FIG. 8 is a block diagram of a completion queue engine according to an example embodiment of the present invention.

FIG. 8 shows a block diagram of a completion engine according to an example embodiment of the present invention. Completion queue engine 14 consists of a finite state machine 132 local bus registers 130, completion queue (CQ) context memory 134, event queue (EQ) work registers 136 and completion queue (CQ) work registers 138. Completion queue engine 14 communicates with local bus 22 allowing software to program completion queue registers 138 in channel adapter 10. Local bus 22 allows software to program information related to the configuration of the completion queues and event queues 120 in system memory. Local bus 22 may propagate accesses from software into 32 bit reads or writes of individual registers within channel adapter 10. Completion queue engine 14 also communicates with packet processing engine 16 allowing completion and event requests to be handled. Completion queue engine 14 uses host interface 18 to write to completion queues and the event queue in system memory. Address translation engine 12, as noted previously, allows completion queue engine 14 (i.e., a requestor) to convert virtual addresses to physical addresses. Completion queue engine 14 communicates with link interface 20 allowing link events (events occurring on the switched fabric network) to be posted in event queue 120.

Figure 9:
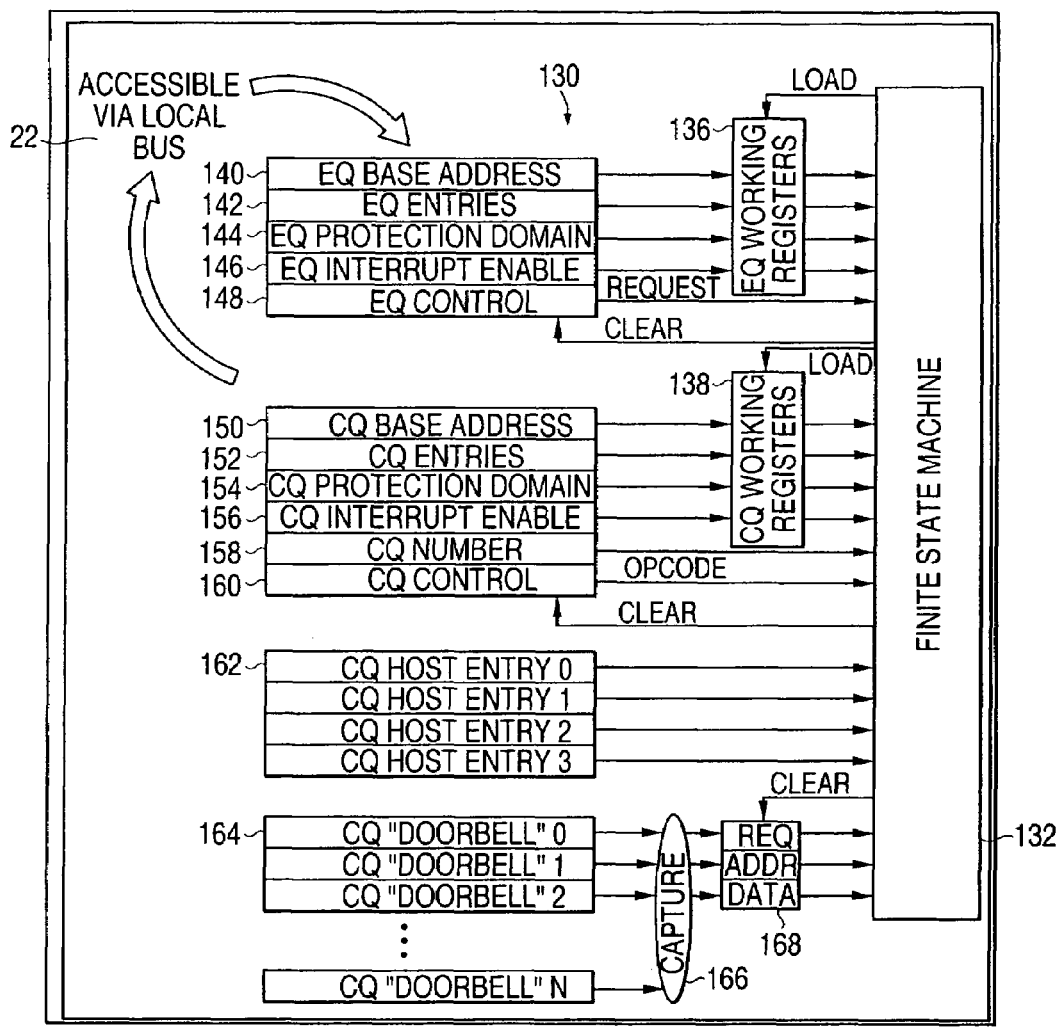
FIG. 9 is a diagram of local bus registers according to an example embodiment of the present invention.

FIG. 9 shows a diagram of local bus registers and working registers according to an example embodiment of the present invention. Local bus registers 130 may include event queue (EQ) registers, completion queue (CQ) registers, and working registers. EQ registers may include EQ base address register 140, EQ entries number register 142, EQ protection domain register 144, EQ interrupt enable register 146, and EQ control register 148. CQ registers may include CQ base address register 150, CQ entries number register 152, CQ protection domain register 154, CQ interrupt enable register 156, CQ number register 158, and CQ control register 160.

Moreover, a set of one or more CQ host entry registers 162 and one or more CQ doorbell registers 164 may also be a part of local bus registers 130. EQ working registers 136 serve as buffers between EQ registers 140 through 146 and finite state machine 132. Similarly, CQ working registers 138 serve as a buffer between CQ registers 150 through 156 and finite state machine 132.

Programming event queue 120 may consist of writing the EQ base address, number of entries, protection domain, and interrupt enable registers 140,142,144, and 146 respectively.

To complete event EQ programming, software may write to event queue control register 148. Writing event queue control register 148 generates a request to finite state machine 132 indicating that the values of EQ base address register 140, EQ protection domain register 144, EQ interrupt enable register 146, and EQ entries register 142 need to be updated. Finite state machine 132 processes this request by loading EQ working registers 136 with the updated values and clearing the EQ control register 148. These working EQ registers may be used to allow simultaneous updates of all programmable EQ fields. This allows software the ability to dynamically move event queue 120 with no impact on channel adapter 10.

Finite state machine 132 clears EQ control register 148 once new working values are in use. Since finite state machine 132 handles all event queue activity for channel adapter 10, an autonomous move of event queue 120 is guaranteed since other event queue activity can be cleanly completed prior to working registers 136 being updated. This allows software flexibility to grow event queue 120 during normal operations as more and more applications begin sending and receiving data via channel adapter 10 (and subsequently generate more and more events). Software need not halt transmitting packets or suspend the processing of work queues for this to occur autonomously.

Programming the completion queue works similarly to programming the event queue. The difference being that there may be only one or few event queues 120, whereas, there may be many completion queues 110. CQ number register 158 is programmed to selectwhich completion queue is targeted for programming (rather than supporting multiple registers for each unique completion queue). This eliminates the need to have a large number of registers to support all completion queues (e.g., 256completion queues). Moreover, this approach scales well for future channel adapters that may support up to 32 million completion queues or more. Programming a given completion queue may consist of writing CQ base address register 150, CQ entries register 152, CQ protection domain register 154, and CQ number register 158. CQ control register 160 contains an opcode field used to allow software to enable or disable any completion queue supported by channel adapter 10. This allows for all of the same advantages discussed previously regarding event queue programming. Specifically, autonomous updates are easily controlled by finite state machine 132 allowing software to dynamically grow, shrink, add, move, or relocate completion queues as the system requirements change. Completion queue working registers 138 may be used to allow additional scalability to the number of completion queues supported by channel adapter 10. Finite state machine 132 uses information associated with one completion queue at a time (i.e., single threaded approach to process and completion requests). This information may be contained in CQ working registers 138.

Figure 10:
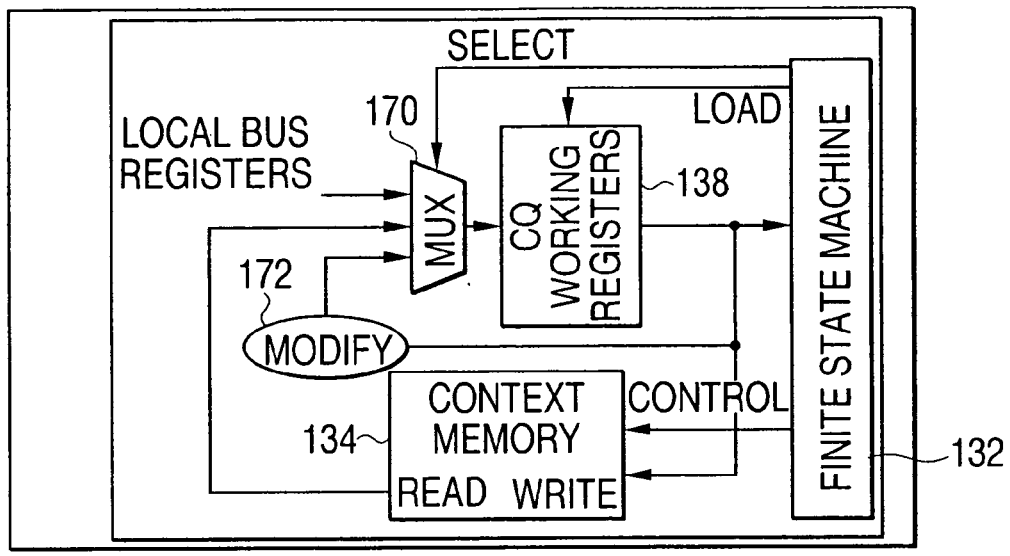
FIG. 10 is a diagram of CQ working registers according to an example embodiment of the present invention.

FIG. 10 shows a diagram of CQ working registers according to an example embodiment of the present invention. When a completion queue is enabled, the values programmed from local bus 22 may be written to CQ working registers 138. These values may then be moved into a context memory 134 by finite state machine 132. When a completion queue request is issued to finite state machine 132, the requested completion queue context may be loaded from context memory 134 into CQ working registers 138. Finite state machine 132 then uses the information in CQ working registers 138. During processing, finite state machine 132 may modify the values in CQ working registers 138 using modify logic 172 and pass these modified values through switching device 170 back into CQ working registers 138. For example, values may be modified as pointers are incremented and addresses become valid, etc. When a requested operation is completed, finite state machine 132 may write the values associated with the given completion queue from CQ working registers 138 back into context memory 134. Using a single completion queue working register set according to the present invention allows the number of completion queues supported by a channel adapter to grow based only on the size of context memory 134 used. For example, a random access memory (RAM) component may be used to support 256 completion queues. A synchronized dynamic random access memory (SDRAM) may be used to support larger numbers of completion queues.

Referring back to FIG. 9, CQ host entry registers 162 also allow increased software flexibility. An opcode value in CQ control register 160 may be used to indicate that the values written into CQ host entry registers 162 should be added to the completion queue indicated by CQ number register 158. This allows software to have control over a completion queue, enabling, disabling, moving, resizing, as well as adding entries to the queue. This may also allow software to own a completion queue in its entirety without impacting the packet processing portions of channel adapter 10 or other hardware control completion queues. Therefore, according to the present invention, both software and hardware may own different completion queues at the same time.

Again referring back to FIG. 9, a set of registers, CQ doorbell registers 164, allow software the capability to enable automatic event generation per completion queue. CQ doorbell registers 164 represent memory mapped doorbell space in main memory. Local bus writes by software to CQ doorbell registers 164 may be referred to as completion queue doorbells since they may share the same memory mapped region allocated for a channel adapter doorbell tokens. Using a memory mapped address space to support the event enabling allows a channel adapter to let software applications (as opposed to operating system and driver software) have control over the event enabling. A given software application sending and receiving messages via a channel adapter may use the memory map to completion queue doorbell registers 164 to control the generation of events per completion without help from the operating system. This provides the application a performance improvement in that an application does not have to involve an additional layer of driver or operating system software to enable events per completion queue.

An address associated with a completion queue doorbell may be captured and used to determine the completion queue number for which the completion queue doorbell is intended. A completion queue engine according to the present invention may support multiple doorbell "strides". A doorbell stride refers to the relative offset of each completion queue doorbell address in the memory mapped space designated for completion queue doorbells. For example, a channel adapter may support an 8K byte doorbell stride, meaning thatwithin the memory mapped space allocated for completion queue doorbells, each doorbell register decoded by a channel adapter is offset by 8K bytes.

Figure 11:
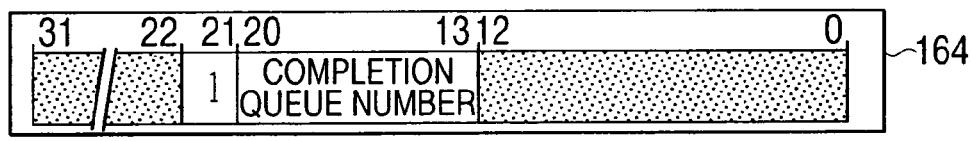
FIG. 11 is a diagram of a doorbell address format according to an example embodiment of the present invention.

FIG. 11 shows a doorbell address format according to an example embodiment of the present invention. In this example embodiment, a completion queue number is encoded within address bits 20-13, therefore, suggesting an 8K doorbell stride. A particular channel adapter may implement variable doorbell strides within the channel adapter. For example, a 4K doorbell stride may use address bits 19-12. A 16K doorbell stride may use address bits 21-14, etc. Changing the doorbell stride (larger or smaller) shifts the completion queue number encoding in the address by 1 bit. Supporting multiple doorbell strides allows software flexibility in the amount of memory allocated to support memory mapped completion queue doorbells and work queue doorbells. For example, if a channel adapter supports 256 completion queues, with an 8K doorbell stride, the total memory allocated to support these doorbell registers is 2M. As a channel adapter supports a larger number of completion queues, it becomes apparent that the memory space allocated for completion queue doorbells grows dramatically (e.g., supporting 64K completion queues requires a great deal of memory).

Figure 12:
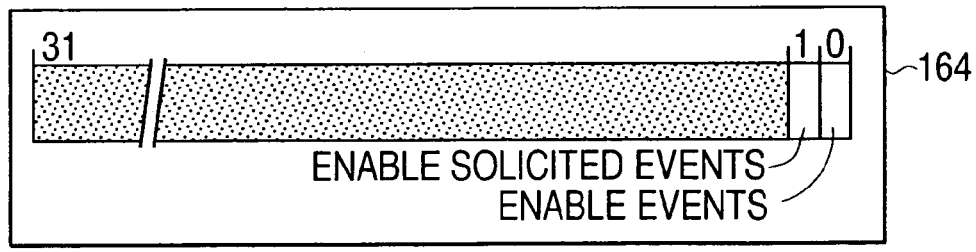
FIG. 12 is a diagram of a doorbell data format according to an example embodiment of the present invention.

FIG. 12 shows a diagram of a data format for a completion queue doorbell according to an example embodiment of the present invention. The two enable bits shown are captured along with the completion queue number, and a request is passed to finite state machine 132. Finite state machine 132 loads the enable bits into context memory 134 based on the captured value of the completion queue number. The completion queue engine 14 supports event enabling for both solicited and local events. Solicited events may be requested by a remote channel adapter sending messages to the current channel adapter. The message, upon receipt and generation of the completion queue request, generates a work queue event on the event queue if the solicited event bit has been enabled for the given completion queue. The solicited event request may be passed to the completion queue engine as part of a completion queue request from packet processing engine 16. A local event works in the same manner, but may be configured by software running locally rather than being based on a message from a remote channel adapter.

The ability for software to have a memory mapped access to a completion queue doorbell space provides several advantages. First, this allows the coalescing of information that was discussed above. Software can configure specific completion queues to report updates by placing entries on the event queue. Furthermore, the event queue may be configured to report updates by generating a system interrupt (based on EQ interrupt enable register 146 programmed by local bus 22). This provides a significant performance advantage in that a processor (e.g., host) never has to read information directly from a channel adapter. An interrupt service routine may simply process entries added to the event queue and from that information can process the appropriate completion queues and work queues. Another advantage exists in that completion queue doorbells allow the ability for application software to effectively own a completion queue. Making doorbell registers memory mapped allows applications the ability to write those registers thereby controlling event generation for some number of completion queues.

Figure 13:
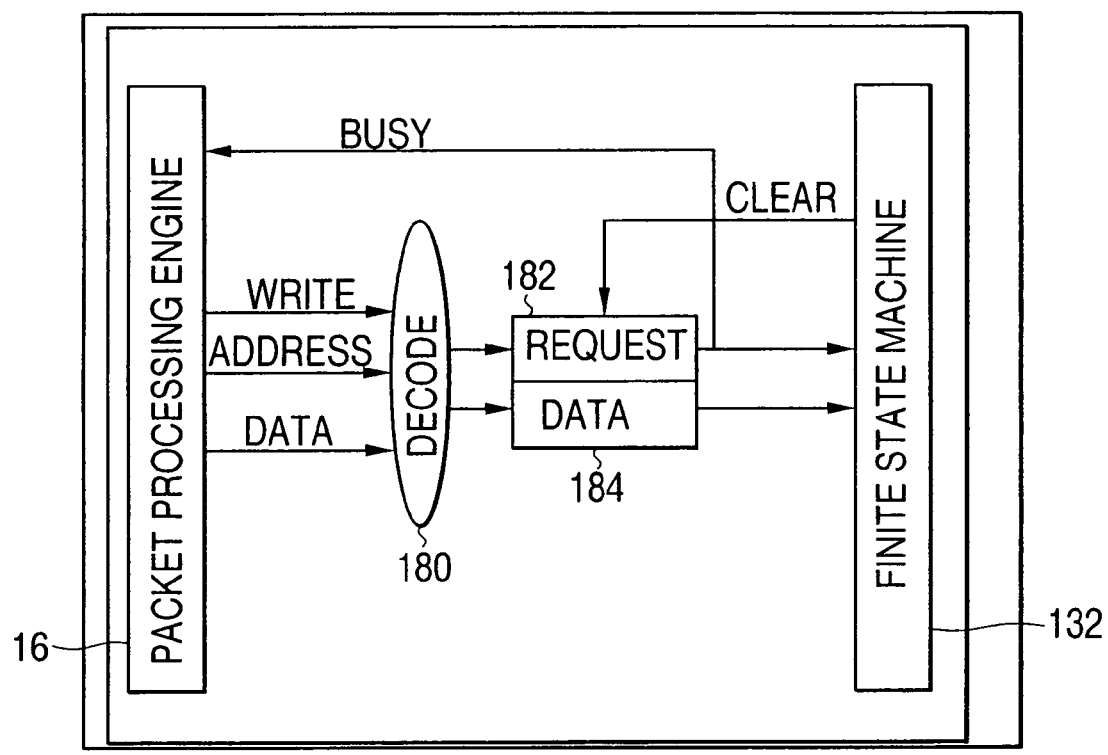
FIG. 13 is a diagram of an interface between a packet processing engine and finite state machine according to an example embodiment of the present invention.

FIG. 13 shows a diagram of an interface between a packet processing engine and finite state machine according to an example embodiment of the present invention. When the microcode running in packet processing engine 16 needs to generate a completion queue entry or an event queue entry, it may simply load the relevant data (e.g., completion queue number, descriptor status, immediate data, etc.) into request registers 182. An address is used to select which register is targeted by the appropriate data. Completion queue engine 14 may use a decoder 180 to decode writes from packet processing engine 16 and generate a request signal to finite state machine 132 with the relevant data associated with the request. Finite state machine 132 processes the request and clears the internal request signal. The only status that may be returned to packet processing engine 16 is that the request registers 182 are busy. This busy indication may only be checked before packet processing engine 16 writes the next completion or event queue request to completion queue engine 14. Generally, there is sufficient time for completion queue engine 14 to process and then clear the request prior to the micro-engine's next request. Therefore, according to the present invention a packet processing engine 16 can simply "fire and forget" a single completion queue or event queue request so long as the busy indication is checked before generating the next request.

FIG. 14 is a flowchart of CQ request processing according to an example embodiment of the present invention. A finite state machine receives a CQ request from a packet processing engine (PPE) S1. A busy signal is generated to the packet processing engine S2. The context memory location associated with the completion queue number is read S3. The data is loaded into the working registers S4. It is determined whether the completion queue has been enabled via the local bus S5. If the completion queue has been enabled, and if the physical page address stored in context memory 134 is invalid, an address translation is issued S6. If the completion queue has not been enabled, an error signal is generated S8. The valid/invalid indication refers to the copy of the physical address stored in context memory 134. A translation request to the TPT may only be needed if the context memory does not contain a valid address (i.e., physical address is invalid). Finite state machine 132 may write back the physical address status as invalid when a page boundary is crossed (forcing the next access to that completion queue to request a translation, etc.).

The completion queue engine waits for address translation to complete S6A. The address translation is then checked for errors S7, and if errors exist an error signal is generated 58. If there are no address translation errors, an inbound write request is issued to the host interface writing a new completion queue entry to the completion queue in system memory S9. It is checked to see if a solicited event was requested S10. If no solicited event was requested the process ends S18. If a solicited event was requested, it is determined whether events were enabled S11, and if so, the event is generated S14. If events were not enabled, the process ends S13. Further, if solicited events were requested S10, it is determined if there were any errors S12, and if so, the event is generated S14. If there are no errors, the process terminates S13. If the event is generated S14, the eventenable is cleared S17, and modified values are written from the work registers back into context memory S15. The busy status is then cleared S16.

FIG. 15 shows a flowchart of an event key request processing according to an example embodiment of the present invention. A finite state machine receives an event queue request from a packet processing engine S20. A busy signal is generated to the packet processing engine S21. It is determined whether the event queue has been enabled via the local bus S22 If the event queue has been enabled, and if the physical page address stored in context memory 134 is invalid, an address translation is issued S23. If the event queue has not been enabled, an error signal is generated S32. The completion queue engine waits for address translation to complete S23A. It is then determined if the address translation has errors S24, and if so, an error signal is generated S25. If the address translation does not have errors, an inbound write request is issued to the host interface writing a new event queue entry to an event queue in system memory S26. A check is made to determine if any errors have been associated with this event S27. If errors exist, an error signal is asserted S28. If no errors exist, it is then determined if interrupts are enabled S29, and if so, an interrupt is generated to host interface S30. If interrupts are not enabled, the busy status is cleared S31. If an interrupt is generated, the interrupt enable bit is then cleared S32. The busy status is then cleared S31.

FIG. 16 shows a flowchart of completion queue request processing according to an example embodiment of the present invention. A finite state machine receives a local bus initialize CQ request S40. The context memory is then written with data from the local bus S41. The local bus CQ opcode field is then cleared S42.

FIG. 17 shows a flowchart of event queue request processing according to an example embodiment of the present invention. A finite state machine receives a local bus initialize EQ request S50. The EQ working registers are written with data from the local bus S51. The local bus EQ opcode field is then cleared S52.

FIG. 18 shows a flowchart of deactivate completion queue request processing according to an example embodiment of the present invention. A finite state machine receives a local bus deactivate CQ request S60. The context memory location is written as invalid for the completion queue provided by the local bus S61. The local bus completion queue opcode field is cleared S62.

FIG. 19 shows a flowchart of completion queue doorbell processing according to an example embodiment of the present invention. A finite state machine receives a local bus CQ doorbell S70. The two enable bits are written into the context memory location for the CQ provided with the CQ doorbell from the local bus S71.

FIG. 20 shows a flowchart of manual completion queue entry processing according to an example embodiment of the present invention. A finite state machine receives a manual CQ entry from the local bus S80. The data is read from the local bus S81. The data is then loaded into the working registers S82. It is determined whether the completion queue has been enabled S83. If the completion queue has been enabled, if the physical page address stored in context memory 134 is invalid, an address translation is issued S84. If the completion queue has not been enabled, an error signal is generated S86. The completion queue engine waits for address translation to complete S84A. It is determined whether the address translation has errors S85, and if so, an error signal is generated S86. If the address translation does not have errors, an inbound write request is issued to the host interface writing a manual completion queue entry to a completion queue in system memory S87. It is then determined whether solicited or normal events have been requested S88, and if not, the process ends S96. If events have been requested, it is determined whether the events are enabled S89, and if not, the process ends S91. If events are requested, it is also determined if there are any errors S90 and if no errors, the process terminates S91. If events are enabled or there are errors, an event is generated S92. The event enable is cleared S95. Modified values of working registers are written back into context memory S93. The local bus CQ opcode field is cleared S94.

It is noted that the foregoing examples have been provided merely for the purpose of explanation and are in no way to be construed as limiting of the present invention. For example, a non-microcode based channel adapter may be implemented with a completion queue engine and address translation engine and still be within the spirit and scope of the present invention. Moreover, although example memory operations of 8 bytes for a protection index request and 24 bytes for a key request have been used to illustrate the present invention, a protection index request or key request may be of any byte size and still be within the scope of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A channel adapter comprising:
   a host interface, the host interface operatively connected to a memory by a local bus, the memory containing at least one completion queue and at least one event queue;
   a link interface, the link interface operatively connected to a network;
   a packet processing engine, the packet processing engine moving data between the host interface and the link interface;
   a completion queue engine, the completion queue engine processing completion requests from the packet processing engine by writing to appropriate at least one of the at least one completion queue and at least one event queue;
   an address translation engine, the address translation engine translating a virtual address into a physical address of a translation protection table in the memory, the address translation engine comprises an inbound request processor and a request completion processor, the inbound request processor receiving a request for address translation of the virtual address, the request completion processor sending the physical address of the memory associated with the virtual address and retrieved from the translation protection table to at least one of the packet processing engine and the completion queue engine in response to the request,
   wherein the packet processing engine is not impacted by any address translation functionality, completion queue accesses, or event queue accesses thereby significantly enhancing the performance of the channel adapter.

2. The adapter according to claim 1, wherein the inbound request processor comprises:
   at least one switching device, the at least one switching device receiving the request for address translation from at least one of the packet processing engine, the completion queue engine, and the request completion processor;
   at least one request register bank, each at least one request register bank comprising a request register, and a data register, the request register storing the request, the data register storing data received from at least one of the packet processing engine, the completion queue engine, and the request completion processor related to the request;
   arbitration logic, the arbitration logic selecting between all outstanding requests and outputting a protection index of one of the requests, the arbitration logic associating a tag value with each request;

a local bus interface, the local bus interface receiving the protection index, checking whether the protection index is out of bounds, and adding the protection index with a base address of the translation protection table generating the physical address to the translation protection table; and a request processor, the request processor sending errors related to the request to the request completion processor, the request processor sending a request and the physical address to the host interface to read the translation protection table.

3. The adapter according to claim 2, wherein the local bus interface comprises a size register and at least one base address register, the size register and at least one base address register being programmable over the local bus by at least one of the operating system and the application, the contents of the size register being compared to the protection index to determine whether the protection index is out of bounds, the base address register containing the base address of the translation protection table.

4. The adapter according to claim 2, wherein the data stored by the data register comprises one of a virtual address, a key, the protection index, and a protection domain.

5. The adapter according to claim 4, further comprising a first valid register associated with the permission checking logic, a second valid register associated with the protection index calculation logic, and a third valid register associated with the bounds checking logic, each valid register containing an indication that the processing for the associated logic may begin.

6. The adapter according to claim 1, wherein the request completion processor comprises a decoder, at least one set of receive data buffers, arbitration logic, at least one staging register, permission checking logic, protection index calculation logic, and bounds checking logic.

7. The adapter according to claim 6, wherein each at least one set of receive data buffers comprises a read complete register and at least one data buffer, the read complete register signaling a request to the arbitration logic once all at least one data buffer for the set have been filled.

8. The adapter according to claim 6, wherein the decoder, at least one set of receive data buffers, and arbitration logic operate at a different clock speed than the at least one staging register, permission checking logic, protection index calculation logic, and bounds checking logic.

9. A computing device with enhanced channel adapter performance comprising:

a memory, the memory containing at least one translation protection table, at least one completion queue, at least one event queue, and at least one of a data buffer and a one work queue; and a channel adapter, the channel adapter comprising:

a packet processing engine, the packet processing engine moving data between a first interface and a second interface;

a completion queue engine, the completion queue engine processing completion requests from the packet processing engine by writing to appropriate at least one of the at least one completion queue and the at least one event queue;

an address translation engine, the address translation engine translating a virtual address into a physical address of the at least one translation protection table in the memory, the address translation engine comprises an inbound request processor and a request completion processor, the inbound request processor receiving a request for address translation of the virtual address, the request completion processor sending the physical address of the memory associated with the virtual address and retrieved from the translation protection table to at least one of the packet processing engine and the completion queue engine in response to the request; and wherein the packet processing engine is not impacted by any address translation functionality, completion queue accesses, or event queue accesses thereby significantly enhancing the performance of the channel adapter.

10. The device according to claim 9, wherein the first interface comprises a host interface, the host interface operatively connected between the channel adapter and the memory by a local bus.

11. The device according to claim 9, wherein the second interface comprises a link interface, the link interface operatively connected between the channel adapter and a network.

* * * * *